US006776348B2

(12) United States Patent
Liu et al.

(10) Patent No.: US 6,776,348 B2
(45) Date of Patent: Aug. 17, 2004

(54) COMBINED FLASH MEMORY CARD DRIVER

(76) Inventors: Wen-Tsung Liu, Fifth Floor, No. 1 Lane 45, Pao-Hsing Road, Taipei Hsien (TW), 231; Chia-Li Chen, Fifth Floor, No. 1, Lane 45, Pao-Hsing Road, Taipei Hsien (TW); Mi-Chang Chen, Fifth Floor, No. 1, Lane 45, Pao-Hsing Road, Taipei Hsien (TW), 231

( * ) Notice: Subject to any disclaimer, the term of this patent is extended or adjusted under 35 U.S.C. 154(b) by 0 days.

(21) Appl. No.: 10/216,610

(22) Filed: Aug. 12, 2002

(65) Prior Publication Data

US 2004/0029407 A1 Feb. 12, 2004

(51) Int. Cl.[7] ........................................ G06K 19/06
(52) U.S. Cl. ........................................ 235/492; 235/483
(58) Field of Search ........................................ 235/482, 483, 235/485, 492, 486, 487, 441

(56) References Cited

U.S. PATENT DOCUMENTS 5,663,553 A * 9/1997 Aucsmith .................. 235/492
5,818,029 A * 10/1998 Thomson .................. 235/486
6,137,710 A * 10/2000 Iwasaki et al. .................. 235/380
6,168,077 B1 * 1/2001 Gray et al. .................. 235/375
6,438,638 B1 * 8/2002 Jones et al. .................. 710/301

* cited by examiner

*Primary Examiner*—Daniel St. Cyr

(57) ABSTRACT

A combined flash memory card driver can be built in or externally connected to a computer or any other digital product to meet consumers' needs for data storage with the flash memory cards. The combined flash memory card driver provides a kind of universal socket suitable for SM, MMC, MS, and SD cards and another kind of universal socket suitable for Type I and Type II CF cards or Type I, Type II and Type III PC cards to access data in any of above flash memory cards. In addition to support all flash memory cards, shortcomings such as easy resulting in confusion, misunderstanding and damage caused in the conventional flash memory card drivers due to a design with three sockets and a transmission unit thereof combining IDE/ATAPI, USB, PCMCIA, and 1394 interfaces.

13 Claims, 4 Drawing Sheets

COMBINED FLASH MEMORY CARD DRIVER

BACKGROUND OF THE INVENTION

1. Field of the Invention

The invention relates to a combined flash memory card driver that can be built in or externally connected to computers or other digital devices to meet the requirements of consumers for data storage and eliminate shortcomings (e.g., easy to result in confusion, misunderstanding, and damage) in conventional flash memory card drivers due to their 3-Socket design with its single or double sockets capable of accessing various types of existing flash memory cards (also referred as memory cards).

2. Description of Related Art

A flash memory card driver is a device to access portable storage memory cards, which is widely used in Information Appliances (IA) and various portable digital products due to their lightweight, high capacity, shockproof feature, and rewrite feature. Currently, many popular products, such as PDA, DSC, MP3 Player, etc., adopt flash memory cards as the storage media.

As a new field, the Information Appliance (IA) industry is abundant with various innovative and complicated products. As the result, flash memory cards become a competing focus among many major manufacturers. However, no acknowledged standard on the specification of flash memory cards is available by now, which results in difficulty interoperability of flash memory cards among portable digital products, computers, peripheral equipment as well as brings inconvenience to consumers.

The major flash memory cards are detailed as follows:

1. PCMCIA ATA Flash Card (PC Card)

The PC Card specification (85.6 mm (L)×54 mm (W), thickness: Type I (3.3 mm), Type II (5.5 mm), Type III (10.5 mm)) is a dedicated one developed by PCMCIA, which is mainly used in Notebooks and portable computers.

2. Compact Flash Card (CF Card)

CF Cards (43 mm (L)×36 mm (W), thickness: Type I (3.3 mm), Type II (5 mm)) are featured with lightweight, small size, highly reliable, and low power consumption, and are favored by consumers. This product is mainly used in IA products (including PDA, DSC, MP3 Player, etc.) and peripheral equipment.

3. Smart Media Card (SM Card)

A SM Card is only 0.76 mm in thickness. It is manufactured by encapsulating a flash memory chip directly in a special card. The electric interface of this card is identical to that of the flash memory chip encapsulated. It is mainly used in digital cameras and MP3 Players.

4. Multimedia Card (MMC Card)

The MMC Card is the smallest one currently available in the market. It is only 1.4 mm in thickness and employs a serial interface. This product is mainly used in MP3 Players and Portable Phones.

5. Memory Stick Card (MS Card)

The MS Card is similar to a chewing gum in size and employs a serial interface. This product is patented to SONY and warranted to other manufacturers. For the moment, products with MS Cards available in the market are exclusively developed by SONY, including digital cameras, MP3 Player, PDA, Portable Phone combining MP3 Player and Internet access, and PC.

6. Secure Digital Card (SD Card)

The SD Card is 2.1 mm in thickness, and is identical to the MMC Card in length and width. It also employs a serial interface, and is mainly used in MP3 Players, DSCs, and PDAs.

To take the market share as soon as possible, manufacturers are exerting their best to develop flash memory card driver products to support various flash memory cards described above. However, because existing flash memory cards are different in size and interfaces, most manufacturers choose to add sockets in their flash memory card drivers to support different flash memory cards. Typical flash memory card drivers employ 3 sockets or 4 sockets. Though this solution can overcome the quandary of supporting partial flash memory cards, it brings more problems and inconvenience to consumers, for example:

1. Too much sockets may result in confusion in application: If a flash memory card driver has four sockets to support SM, MMC, MS, and SM cards, for example, the system will only display several marks (i.e., F Socket/G Socket/H Socket/I Socket) in stead of card types (i.e., SM Socket/MMC Socket/MS Socket/SD Socket) when the driver is applied to the system, which makes it difficult to determine the flash memory card currently available.
2. Too much sockets bring inconvenience in application: In above example, if the driver is designed to support IDE/ATPAI interface, only 2 sockets are available at the same time when the driver is connected to the system. (The IDE/ATPAI interface can only support processing two sets of signals at the system end.) If the user accesses to the third flash memory card, the socket can't work, even system halt may occur.
3. Other problems: the flash memory cards or sockets may be damaged when they are misused due to too much sockets; high cost; large size, hard to be embedded etc.

SUMMARY OF THE INVENTION

In consideration of shortcomings in the conventional flash memory card driver described above, the inventor invents a combined flash memory card driver, which can solve most existing problems described above.

An object of a combined flash memory card driver of the present invention provides a universal socket for SM, MMC, MS, and SD cards of the similar size and another universal socket for CF cards (Type I and Type II) or PC cards (Type I, Type II, and Type III) to access the information in any of above flash memory cards. Furthermore, the invention can support accessing to all flash memory cards with its transmission unit combining IDE/ATAPI, USB, PCMCIA, and 1394 interfaces.

The purpose of this invention is to support various flash memory cards simultaneously with the one socket or double-socket flash memory card driver implemented according to this invention to facilitate above flash memory cards to communicate more simply and conveniently with portable digital products, PCs, and peripheral equipment as well as bring convenience to consumers and eliminating shortcomings in legacy flash memory card drivers.

Another object of the combined flash memory card driver of the present invention is to facilitate the flash memory card driver being built in easily or externally connected to any of various computer systems and peripheral equipment to meet the demands of consumers and integrate the support to various flash memory cards into one flash memory card driver.

BRIEF DESCRIPTION OF THE DRAWINGS

The detail structure, the applied principle, the function and the effectiveness of the present invention can be more fully understood by reference to the following description and accompanying drawings, in which.

DETAILED DESCRIPTION OF THE PREFERRED EMBODIMENT

Figure 1:
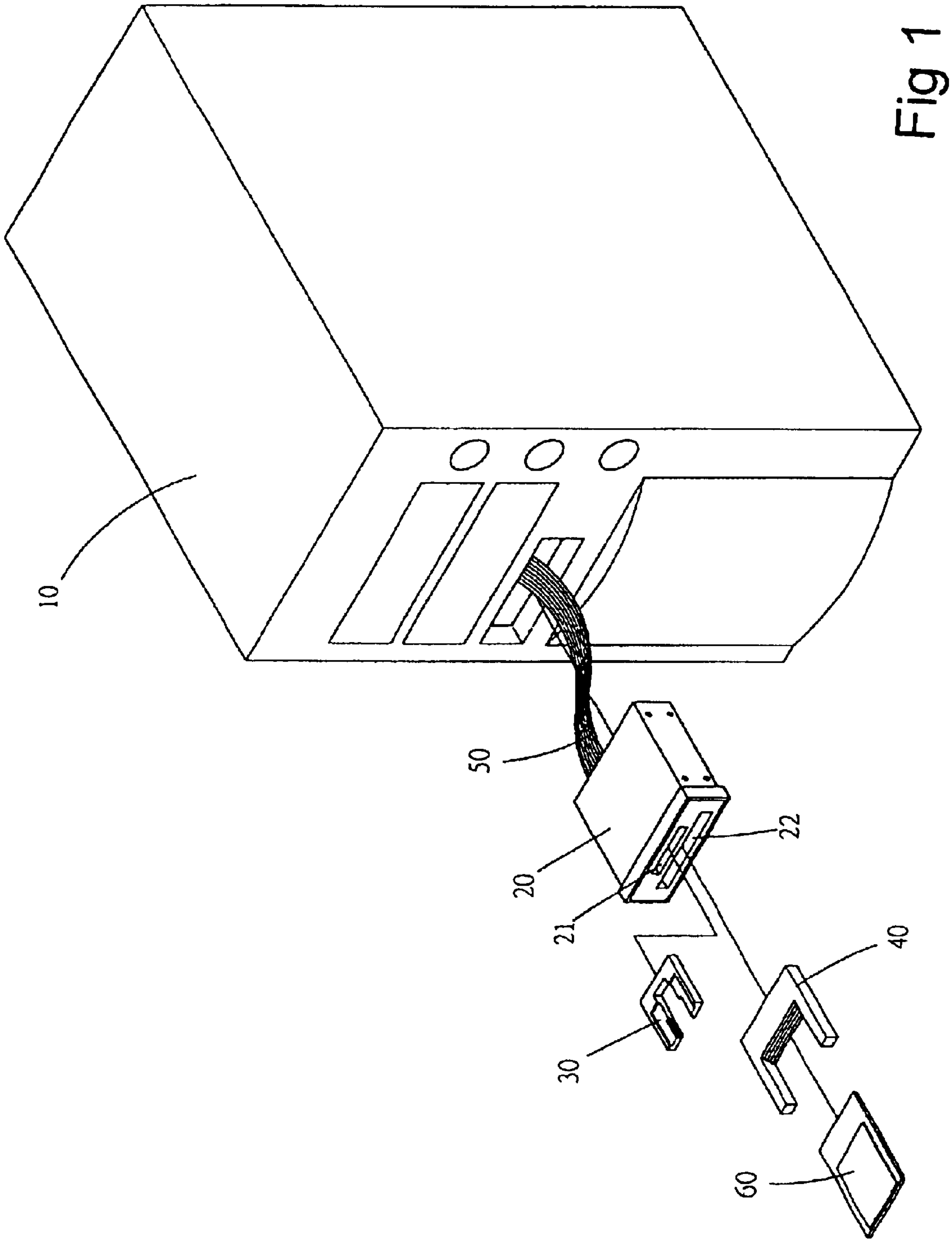
FIG. 1 is a perspective exploded view of a combined flash memory card driver of the invention in a first embodiment thereof, which is built in a computer system.

As shown in FIG. 1, a combined flash memory card driver of the present invention can be built in any computer system (10) or any other digital products (not shown), comprising a main body (20), the first socket (30), the second socket (40), and a transmission unit (50). The main body (20) is a rectangle in appearance, which is suitable to be mounted into any computer system (10) or any other digital products. It can receive circuit boards and other electronic elements and has a first Slot (21) and a second Slot (22) on each side of main body (20) so as to facilitate flash memory cards (60) being inserted into them. The first socket (30) is fixed in the main body (20) corresponding to the first socket (21). The second socket (40) is fixed in the main body (20) corresponding to the second slot (22). When a flash memory card (60) is inserted into the main body (20) via the first slot (21) or the second slot (22), the flash memory card (60) is connected to the first socket (30) or the second socket (40), respectively.

Figure 2:
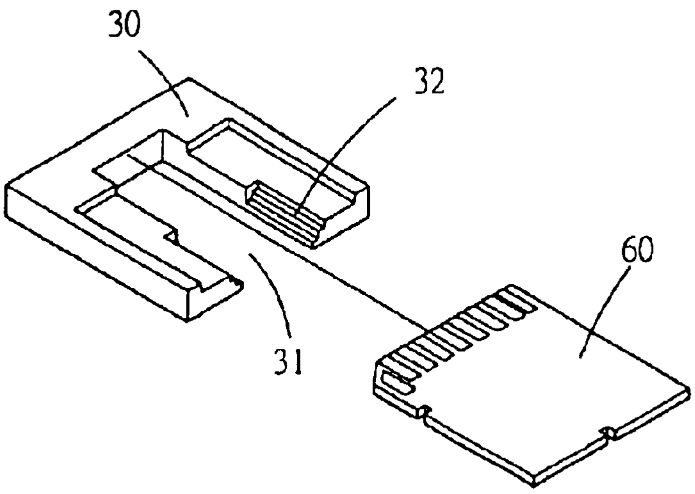
FIG. 2 is a perspective view of the first socket shown in FIG. 1 illustrating a flash memory card in the process of being inserted into the first socket.

As shown in FIG. 2, the first socket (30) is a "U" shape socket, with a clamping area (31) in middle. The clamping area (31) has at least 4 sets of guide grooves (32) of different sizes to guide SM, MMC, MS, and SD cards (60) (only one of the four types is shown in the figure) into the corresponding clamping area (31), which will fix the flash memory card (60) onto the first socket (30). When flash memory card 60 is connected and fixed to first socket (30), it can communicate with the circuit board in the main body (20).

Similarly, the second socket (40) also has a clamping area (31) and several guide grooves (32) of different sizes. However, the guide grooves (32) in the second socket (40) are used to guide various PCMCIA Cards (60) (TYPE I, TYPE II, or TYPE III) (only one of them is shown in the figure), which are identical in width but different in thickness, into the second socket (40). Similarly, when the flash memory card 60 is connected and fixed to the second socket (40), the flash memory card 60 can communicate with a circuit board in the main body (20). It should be emphasized that the flash memory card (60) can be a PCMCIA ATA flash card or a PCMCIA adapter, the latter of which can be used for receiving other flash memory cards, such as SD/MMC/MS/SM cards. It is noted that the present inventor has owned Japanese Utility Model Registration No. 3079263, entitled "Flash Memory Card Adaptor".

Referring to FIG. 1 again, the transmission unit (50) is mainly used for connecting with a computer system (10) at the main body (20) thereof to exchange data between them. When a flash memory card is inserted into the main body (20) via the first slot (21) or the second slot (22), the circuit in the main body (20) can access the data being stored in the flash memory card (60) and transmit the data to the computer system (10) via the transmission unit (50). Similarly, the data sent back from the computer system 910) via the transmission unit (50) can be stored into the flash memory card (60).

It should be noted that the main body (10) of the flash memory card driver in FIG. 1 is embedded in the computer system (10) or other digital products. Therefore, the transfer unit should adopt IDE/ATAPI interface (an existing technology), and an embedding design is preferred. As for the support to the system end, a lead provide for processing only two sets of signals (Master/Slave), i. e., for the conventional 3-socket or 4-socket flash memory card drivers that adopts the IDE/ATAPI interface, only 2 socket are available in actual application.

The 2-socket architecture (30 and 40) of this invention complies with the IDE/ATAPI specification. Although the two sockets (30 and 40) can host different types of flash memory cards (60), only one flash memory card can be inserted in each of the two sockets (60). As the result, it eliminates the erroneous insertion of the flash memory cards (60) into the sockets of the conventional 3-socket or 4socket flash memory card driver.

In other words, this invention can be used more widely than the conventional 3-socket or 4-socket flash memory card drivers. (This invention supports SM. MMC, MS, SD, PC cards (TYPE I, TYPE II, and TYPE III), while conventional 3-socket or 4-socket drivers only support 3 ~4 types of cards). Furthermore, it eliminates the erroneous insertion of the flash memory cards (60) into the socket of the conventional 3-socket or 4-socket flash memory card driver.

Figure 3:
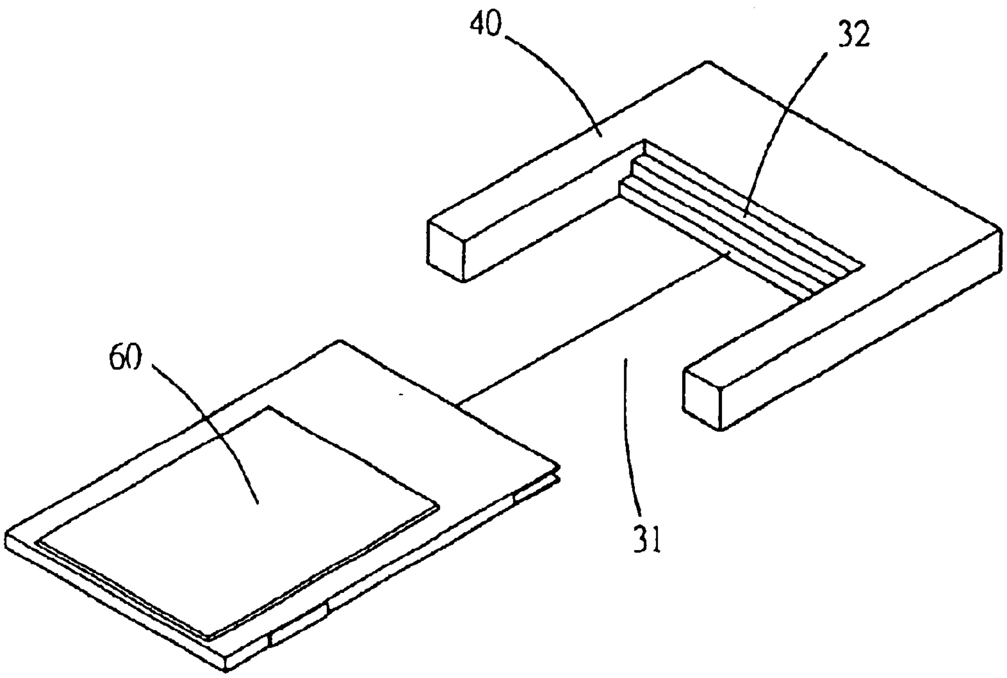
FIG. 3 is a perspective view of the second socket shown in FIG. 1 illustrating another flash memory card in the process of being inserted into the second socket.
Figure 4:
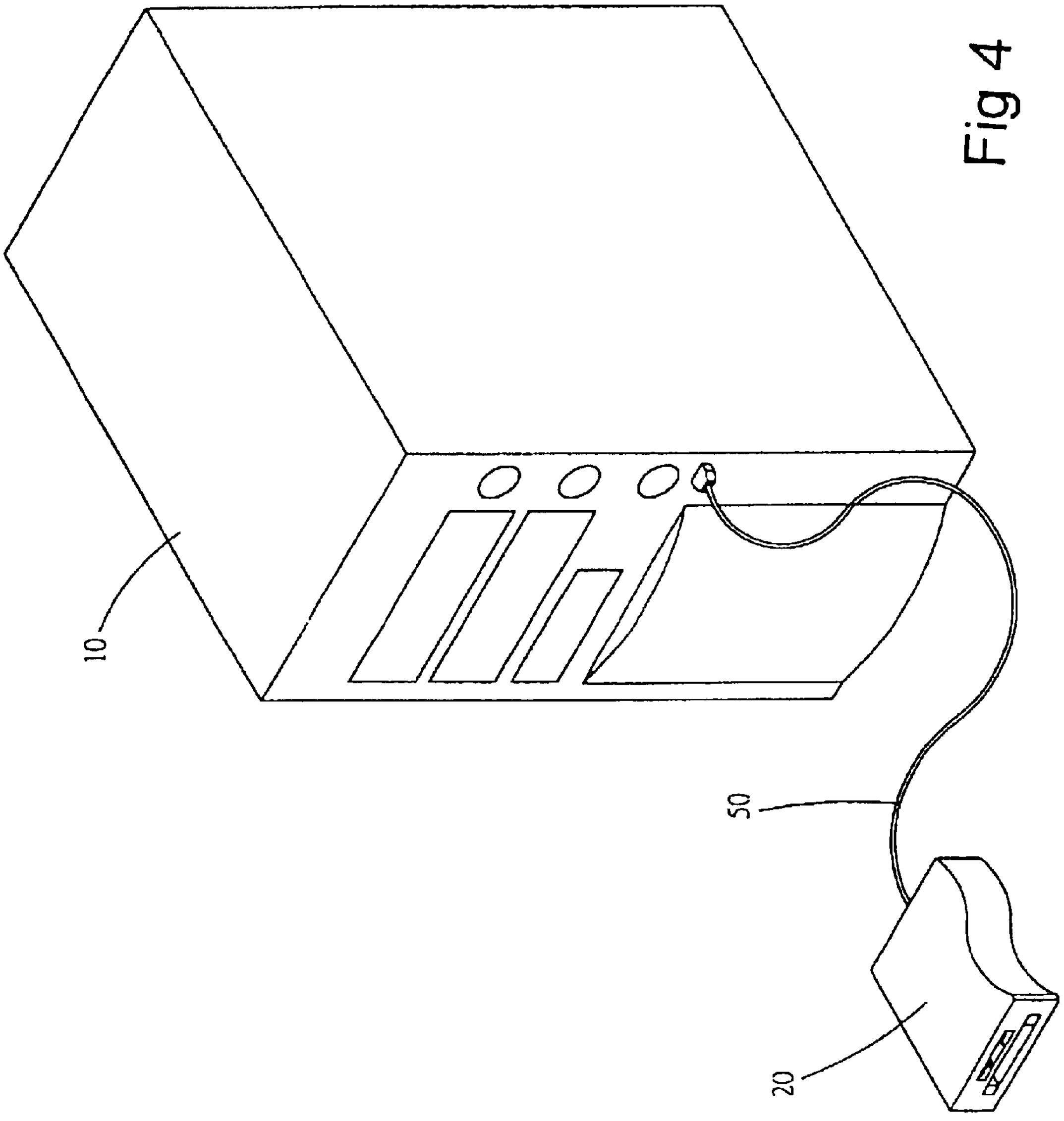
FIG. 4 is a perspective view of a combined flash memory card driver of the invention in a second embodiment thereof, which is externally connected to a computer system.

The flash memory card driver as shown in FIGS. 1 to 3 are built in the computer system (10) or any other digital product directly. In case of the flash memory card being not built in the computer system (10) or any other digital product, the transmission unit (50) can be designed to comply with the specification of a USB or 1394 interface as shown in FIG. 4. In this way, the main body (20) can be externally connected to the computer system for the flash memory card being read out or written in.

Figure 5:
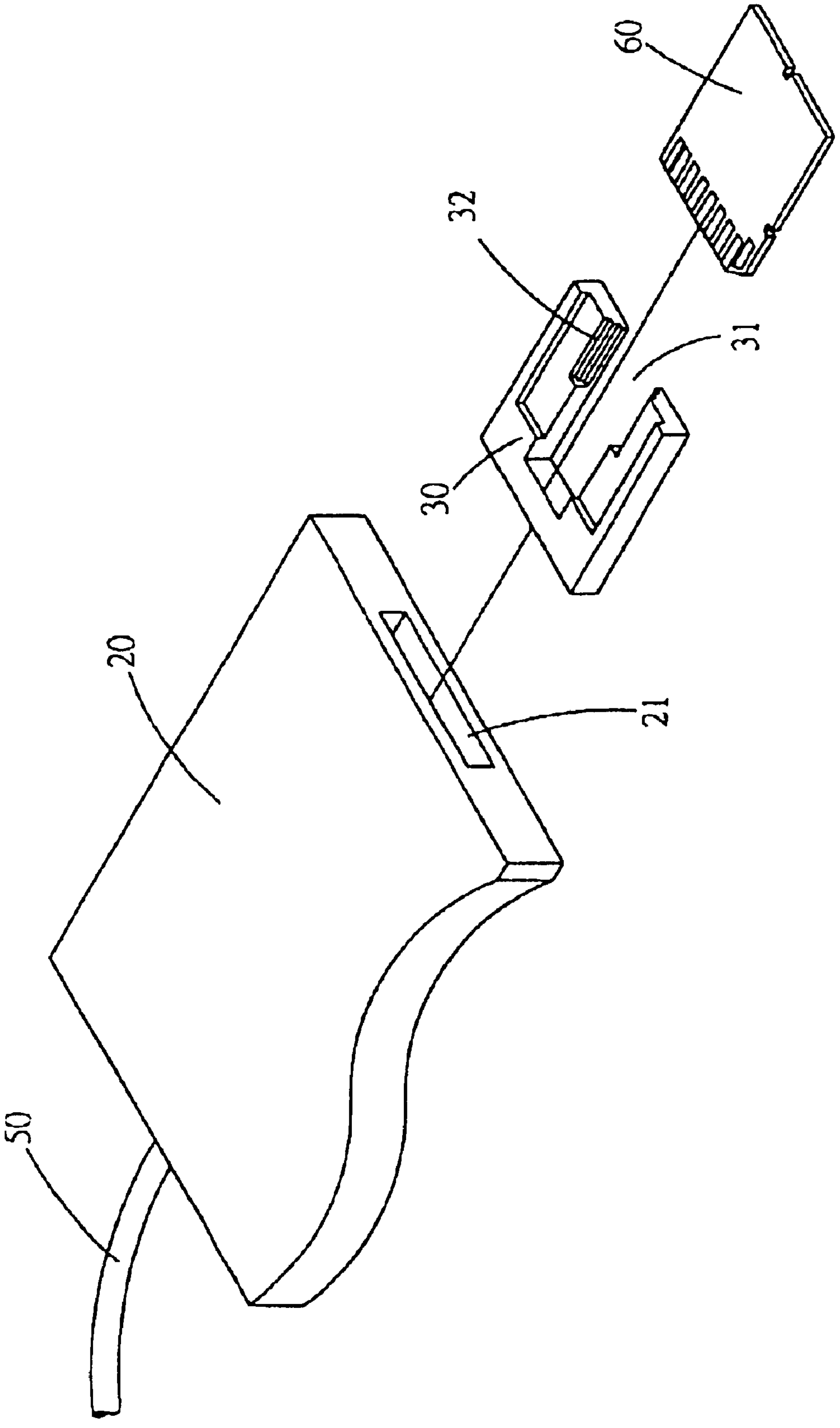
FIG. 5 is a perspective view of a third embodiment of the present invention illustrating a further type combined flash memory card driver only providing one socket.

As shown in FIG. 5, the present invention can provide a single socket instead of double sockets in implementation. A typical embodiment for a single socket has the first slot (21), the first socket (30), and a transmission unit (50) for supporting at least SM/MMC/MS/SM cards.

Besides, the second socket is designed for supporting PC Cards (TYPE I, TYPE II, and TYPE III) or supporting CF Cards (TYPE I and TYPE II).

While the invention has been described with referencing to a preferred embodiment thereof, it is to be understood that modifications or variations may be easily made without departing from the spirit of this invention, which is defined by the appended claims.

What is claimed is:

1. A combined flash memory card driver, comprising:

a main body that can be embedded in a computer main unit system, providing a containing space for receiving a circuit board and other electronic elements and having a first slot and a second slot to facilitate insertion of a plurality of flash memory cards;

a first socket, being disposed at a position corresponding to the first slot, having a clamping area with a plurality of guide grooves to protectively guide the flash memory cards into the first socket such that signals can be transmitted between the respective flash memory card and the circuit board in the main body, wherein the first socket connects to the first slot for receiving SM, MMC, MS and SD cards;

a second socket, being disposed at a position corresponding to the second slot, having a clamping area with a plurality of guide grooves to protectively guide the flash memory cards into the second socket such that signals can be transmitted between the respective flash memory card and the circuit board in the main body, wherein the second socket connects to the second slot for receiving Compact Flash cards or PCMCIA cards;

a transfer unit, connecting the main body and the computer main unit system by way of IDE/ATAPI interface specification for the flash memory cards being inserted into the main body via the first slot or the second slot, and the circuit board in the main body accessing data stored in the cards and then transmitting the data to the computer main unit system.

2. The combined flash memory curd driver as defined in claim 1, wherein the transfer unit further comprises a USB interface to externally connected to the computer main unit system.

3. The combined flash memory card driver as defined in claim 1, wherein the transfer unit can have a 1394 interface such that the main body externally connected to the computer main unit system.

4. The combined flash memory card driver as defined in claim 1, wherein the guide grooves of the first socket can guide any of SD, MMC, MS and SM Cards into the main body at different timings such that data can be transmitted between in any one of the cards and the circuit board in the main body.

5. The combined flash memory card driver as defined in claim 1, wherein the guide grooves of the second slot can guide any one of TYPE I, TYPE II and TYPE III PC cards into the main body at different timings to support the card inserted to communicate with the circuit in the main body.

6. The combined flash memory card driver as defined in claim 1, wherein the second socket can be not only a card with PCMCIA interface but also a PCMCIA interface adaptor and the PCMCIA interface adaptor can admit and guide any one of SD, MC, MS and SM cards.

7. The combined flash memory card driver as defined in claim 1, wherein the guide grooves of the second socket can guide TYPE I and TYPE II of the CF Cards into the main body at different timings.

8. A flash memory card driver hosting several flash memory cards, comprising:

a main body that can be embedded in a computer main unit system, hosting the circuit board and other electronic elements and providing a first slot and a second slot for insertion of flash memory cards;

a first socket connecting to the first slot for receiving memory cards having an interface or size similar to compact flash card, a clamping area of the first socket has multi-guide grooves to guide a flash memory card into the first socket, which will communicate with the circuit board of the main body after the card is inserted and fixed;

a second socket connecting to the second slot for receiving memory cards having an interface or size smaller than CF cards, a clamping area of the second socket has multi-guide grooves to guide a flash memory card into the second socket, which will communicate with the circuit board of the main body after the card is inserted and fixed;

a transfer unit connecting the main body or the flash memory card to the computer system; the flash memory card is inserted in the main body via the first slot or the second slot, and the circuit in the main body will access the data stored in these cards to and then transfer the data to the computer main unit system.

9. The flash memory card driver of claim 8, wherein the memory cards received by the first slot include TYPE I and TYPE II of CF cards.

10. The flash memory card driver of claim 8, wherein the memory cards received by the second slot include SM, MMC, MS and SD cards.

11. A flash memory card driver hosting several flash memory cards, comprising:

a main body that can be embedded in a computer main unit system, hosting the circuit board and other electronic elements and providing a first slot and a second slot for insertion of flash memory cards;

a first socket connecting to the first slot for receiving memory cards having an interface or size similar to PCMCIA card, a clamping area of the first socket has multi-guide grooves to guide a flash memory card into the first socket, which will communicate with the circuit board of the main body after the card is inserted and fixed;

a second socket connecting to the second slot for receiving memory cards having an interface or size smaller than PCMCIA cards, a clamping area of the second socket has multi-guide grooves to guide a flash memory card into the second socket, which will communicate with the circuit board of the main body after the card is inserted and fixed;

a transfer unit connecting the main body of the flash memory card to the computer systems; the flash memory card is inserted in the main body via the first slot or the second slot, and the circuit in the main body will access the data stored in these cards to and then transfer the data to the computer main unit system.

12. The flash memory card driver of claim 11, wherein the memory cards received by the first slot include TYPE I, TYPE II and TYPE III PCMCIA cards.

13. The flash memory card driver of claim 11, wherein the memory cards received by the second slot include SM, MMC, MS and SD cards.

* * * * *